(12) United States Patent
Tillotson (10) Patent No.: US 11,281,235 B2
(45) Date of Patent: Mar. 22, 2022

(54) SYSTEMS AND METHODS FOR AVOIDING STRIKES ON MULTI-ROTOR VEHICLES

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/121,460

(22) Filed: Sep. 4, 2018

(65) Prior Publication Data

US 2020/0074870 A1 Mar. 5, 2020

Related U.S. Application Data

(60) Provisional application No. 62/726,003, filed on Aug. 31, 2018.

(51) Int. Cl.
| | |
|---|---|
| *G05D 1/00* | (2006.01) |
| *G05D 1/08* | (2006.01) |
| *B64D 31/06* | (2006.01) |
| *B64C 27/00* | (2006.01) |
| *G06K 9/00* | (2022.01) |
| *G08G 5/04* | (2006.01) |

(Continued)

(52) U.S. Cl.
CPC ......... *G05D 1/0816* (2013.01); *B64C 27/006* (2013.01); *B64D 31/06* (2013.01); *G05D 1/0055* (2013.01); *G06K 9/0063* (2013.01); *G08G 5/045* (2013.01); *B64C 39/024* (2013.01); *B64C 2201/024* (2013.01); *B64C 2201/14* (2013.01); *G05D 1/0066* (2013.01); *G06T 7/20* (2013.01); *G06T 7/62* (2017.01); *G06T 2207/10016* (2013.01); *G06T 2207/10028* (2013.01); *G06T 2207/10044* (2013.01); *G06T 2207/30241* (2013.01); *G06T 2207/30261* (2013.01); *H02P 5/56* (2016.02)

(58) Field of Classification Search
CPC ............ G06T 7/20; G06T 2207/30241; G06T 2207/30261; G08G 5/045; B64C 27/006; G05D 1/0055; G06K 9/0063
USPC ........................................................ 701/3
See application file for complete search history.

(56) References Cited

U.S. PATENT DOCUMENTS

| 7,598,888 B2 * | 10/2009 | Matuska ................. G01C 5/005 340/945 |
| 9,047,675 B2 * | 6/2015 | Tillotson ................... G06T 7/20 |

(Continued)

OTHER PUBLICATIONS

Verbeke et al., "Vibration analysis of a UAV multirotor frame", Sep. 2016, 10 pages, Oostende, Belgium.

*Primary Examiner* — Thomas E Worden
*Assistant Examiner* — Tiffany P Ohman
(74) *Attorney, Agent, or Firm* — Haynes and Boone, LLP (57) ABSTRACT

Methods and systems according to one or more examples are provided for avoiding foreign object strikes on rotorcraft vehicles. In one example, a vehicle comprises a rotor comprising a rotor blade, a first sensor configured to provide first sensor information associated with an object proximate the vehicle, and a second sensor configured to provide second sensor information associated with the rotor. The vehicle further comprises a processor coupled to the first sensor and the second sensor configured to selectively control the rotor to minimize damage to the vehicle by the object based on the first and second sensor information.

20 Claims, 8 Drawing Sheets

(51) Int. Cl.
*H02P 5/56* (2016.01)
*G06T 7/62* (2017.01)
*B64C 39/02* (2006.01)
*G06T 7/20* (2017.01)

(56) References Cited

U.S. PATENT DOCUMENTS

| | | | |
|---|---|---|---|
| 10,944,573 B1* | 3/2021 | Eisenmann | G06K 9/6215 |
| 2015/0379876 A1* | 12/2015 | Navot | G08G 5/0021 |
| | | | 701/301 |
| 2019/0185149 A1 | 6/2019 | Pantalone et al. | |

* cited by examiner

SYSTEMS AND METHODS FOR AVOIDING STRIKES ON MULTI-ROTOR VEHICLES

CROSS REFERENCE TO RELATED APPLICATIONS

This application claims the benefit of and priority to U.S. Provisional Patent Application No. 62/726,003 filed Aug. 31, 2018 and entitled "SYSTEMS AND METHODS FOR OPERATING MULTI-ROTOR VEHICLES" which is incorporated herein by reference in its entirety.

TECHNICAL FIELD

The present disclosure relates generally to multi-rotor vehicles, and more specifically to improved techniques for avoiding strikes by foreign objects on multi-rotor vehicles.

BACKGROUND

Multi-rotor vehicles are becoming increasingly popular for use as drones to provide surveillance, cargo vehicles for delivery of packages, and air vehicles to carry passengers, for example. As interest grows, advanced multi-rotor vehicles are becoming smaller and more economical to produce and use. Strikes by foreign objects on a multi-rotor vehicle, and in particular at a rotor of a multi-rotor vehicle, may affect the vehicle's ability to effectively operate resulting in reduced maneuverability, downtime for repairs, and higher operational costs.

Accordingly, there is a need for improved systems, apparatus, and related methods to effectively avoid strikes by foreign objects on a multi-rotor vehicle.

SUMMARY

Methods and systems are disclosed herein that provide improved techniques for avoiding a strike by a foreign object on a multi-rotor vehicle. In some examples, a multi-rotor vehicle, such as a multi-rotor rotorcraft may have at least two rotors and typically includes four to eight rotors. The rotors provide lift to the vehicle, used for both take-off and landing. One or more sensors are located on the vehicle to provide information of an approaching object's size and movement. Additional sensors are included on the vehicle to provide information for a position and/or a sweep zone of each of the rotors. As used herein, for example, "A and/or B" can mean A alone, B alone, or A and B taken together. A processor is used to process the sensor information to determine a current path of the approaching object relative to the vehicle, and if it is determined an impact with the object is likely, adjust one or more of the rotors to avoid the impact, or at least minimize damage to the vehicle and/or the rotor if an impact cannot be avoided.

In one example, a vehicle includes a rotor comprising a rotor blade; a first sensor configured to provide first sensor information associated with an object proximate the vehicle; a second sensor configured to provide second sensor information associated with the rotor; and a processor coupled to the first sensor and the second sensor configured to selectively control the rotor to minimize damage to the vehicle by the object based on the first and second sensor information.

In another example, a method of reducing damage to a vehicle includes receiving first sensor information associated with an object proximate the vehicle; receiving second sensor information associated with a rotor; and selectively controlling the rotor to reduce damage to the vehicle by the object based on the first and second sensor information.

The scope of the disclosure is defined by the claims, which are incorporated into this section by reference. A more complete understanding of examples of the disclosure will be afforded to those skilled in the art, as well as a realization of additional advantages thereof, by a consideration of the following detailed description of one or more examples. Reference will be made to the appended sheets of drawings that will first be described briefly.

BRIEF DESCRIPTION OF THE DRAWINGS

Examples of the present disclosure and their advantages are best understood by referring to the detailed description that follows. It should be appreciated that like reference numerals are used to identify like elements illustrated in one or more of the figures.

DETAILED DESCRIPTION

Various examples of the present disclosure provide for improved approaches to avoiding strikes by foreign objects on single rotor or multi-rotor vehicles. Multi-rotor vehicles that may be operationally affected by object strikes include, but are not limited to, multi-rotor vertical take-off and landing (VTOL) vehicles. Multi-rotor VTOL vehicles generally have relatively small rotors that are relied on for lift and maneuverability. Multi-rotor VTOL vehicles have at least two rotors, and typically include four to eight rotors, arranged in pairs symmetrically about a longitudinal vertical plane of the vehicle. Each rotor typically has two rotor blades. The rotor's blades are thicker at a base near a hub of the rotor and outwardly taper toward the tip of the blade. The rotor blade moves faster through the air at the rotor blade tip, and an object strike at or near the tip may cause more damage to the rotor than a strike nearer to the hub. Therefore, it is advantageous, in the case of an imminent strike by an object, to avoid the strike at the tip of the rotor blade to reduce damage to the rotor and/or the vehicle. Principles discussed herein with respect to multi-rotor vehicles apply equally to single rotor vehicles.

Illustrative examples provide a system and method for detecting an object proximate a rotor of the vehicle using sensors included on the vehicle. A trajectory of the object may be calculated and a determination made whether the object intersects a rotor sweep zone if the vehicle continues on its current flight path. In some examples, the determination of an object strike is based on a probabilistic calculation and the vehicle takes action only if the probability of an object strike exceeds a strike threshold value. In some examples, the vehicle may take action to avoid the strike only if the object's estimated size exceeds a size threshold value.

Illustrative examples include commanding the vehicle to change a flight path to avoid contact with the object. In some examples, the vehicle may climb or descend to avoid contact. In other examples, the vehicle may turn or roll to avoid contact. For example, if the vehicle's flight profile would carry a left-side rotor sweep zone through the object, the vehicle may command a left-side rotor to slow down and a right-side rotor to speed up to roll the vehicle to the left to avoid contact with the object.

Illustrative examples include, in the case where an imminent strike cannot be avoided, reducing damage to the vehicle by adjusting a speed and/or a phase of the rotor to take the strike at the least damaging location on the rotor. In one example, the vehicle may flatten a pitch of a rotor blade to provide maximum structural ability to minimize damage to the rotor.

To maintain proper vehicle orientation and operation, the present disclosure provides for commanding one or more unaffected rotors to adjust a speed so total lift of the vehicle does not change and the vehicle maintains an altitude or a climb rate. In one example, adjusting a speed of one or more unaffected rotors provides for a torque around the vehicle's center of gravity to remain unchanged so that the vehicle maintains an attitude and a turn rate. In another example, adjusting a speed of one or more unaffected rotors advantageously maintains a constant total kinetic energy of the vehicle so that the vehicle's batteries or generator do not need to produce more power or absorb more power.

Figure 1A:
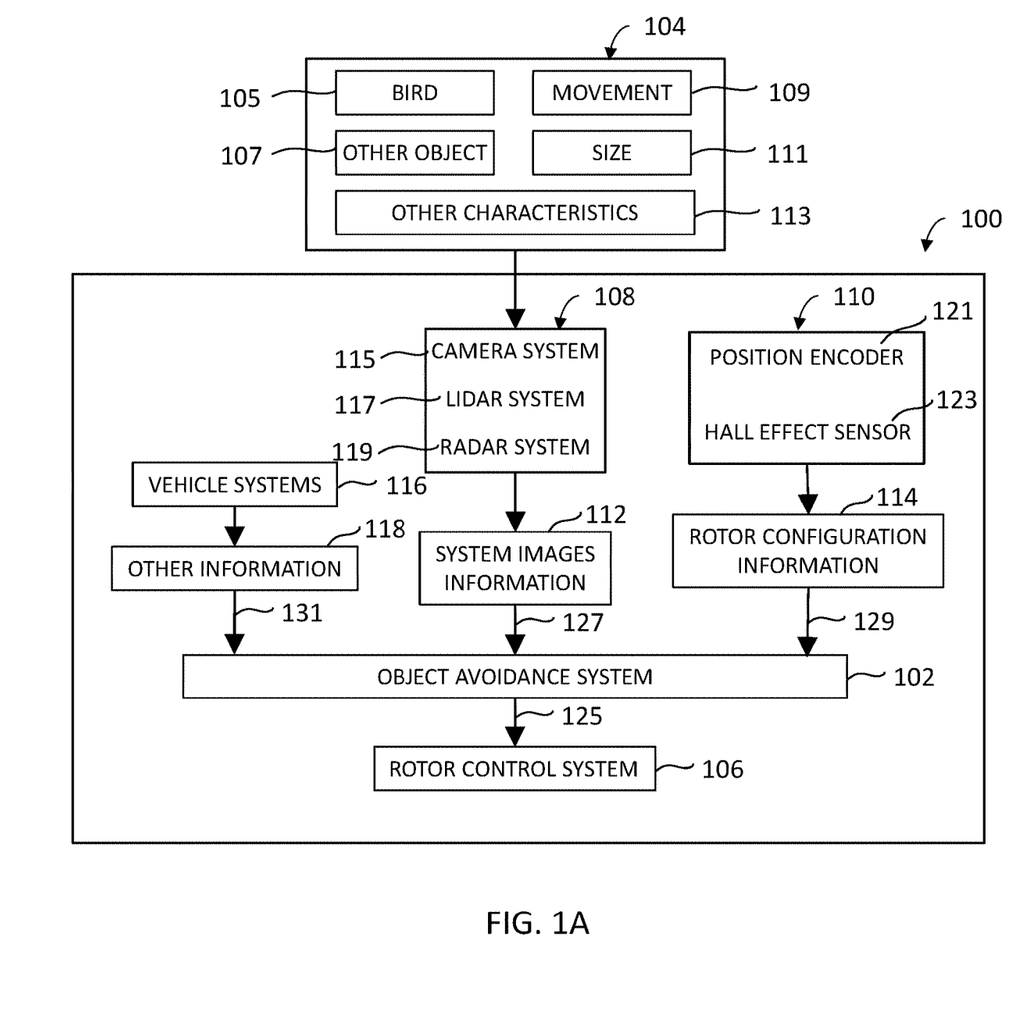
FIGS. 1A and 1B illustrate block diagrams of a multi-rotor vehicle including an object avoidance system in accordance with an example of the disclosure.
Figure 1B:
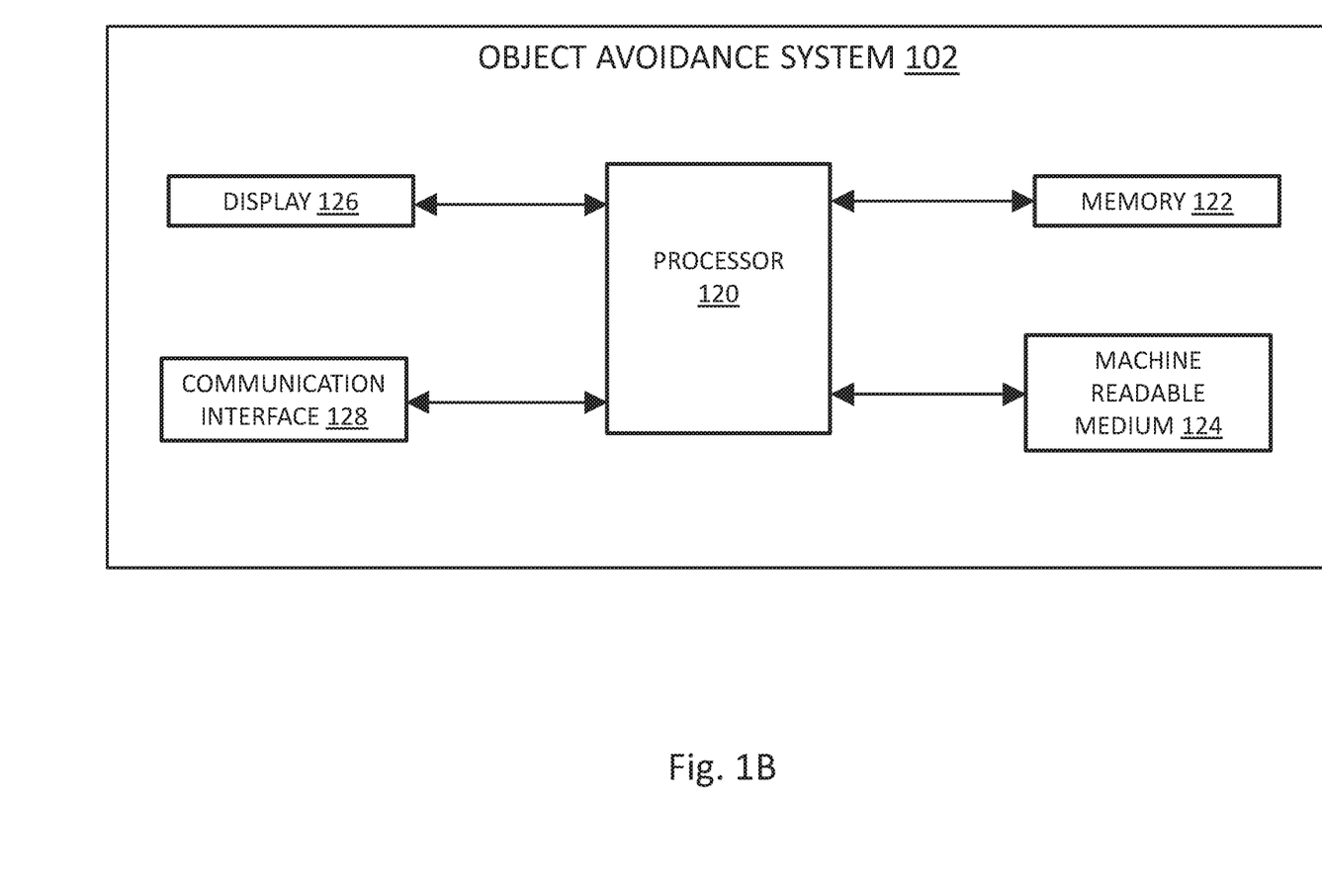

FIGS. 1A and 1B illustrate block diagrams of a vehicle 100 including an object avoidance system 102 in accordance with an example of the disclosure. Vehicle 100 may be implemented as any moving multi-rotor vehicle configured to travel over land, water or air. In one non-limiting example, vehicle 100 may be an aircraft configured as a multi-rotor aircraft. In another non-limiting example, vehicle 100 may be a lighter than air multi-rotor aircraft. In various non-limiting examples, vehicle 100 may be configured as a multi-rotor electric vertical take-off and landing (VTOL) vehicle. Vehicle 100 may be manned or unmanned. Vehicle 100 may be operated by any operator, either positioned within vehicle 100 or operated remotely by wireless or wired communication and control.

Vehicle 100 includes object avoidance system 102. In one non-limiting example, object avoidance system 102 is configured to detect an object 104 and to avoid a strike by object 104 on vehicle 100 based on the detected object. In another non-limiting example, object avoidance system 102 is configured to detect an object 104 and minimize damage to vehicle 100 in the event of an imminent, unavoidable strike by object 104 on vehicle 100.

In one example, object avoidance system 102 is implemented in software running on a dedicated processing system, in hardware, or a combination of hardware and software. In various examples, vehicle 100 is configured to receive sensor information from a sensor system 108 (e.g., a first sensor) and a rotor position system 110 (e.g. a second sensor), and provide control signals 125 to rotor control system 106 of vehicle 100. In another example, various parts of object avoidance system 102 are implemented remote from vehicle 100. The remote parts communicate with vehicle 100 and/or object avoidance system 102 through a wired or wireless communication interface.

Object 104 may be any object that is proximate the vehicle 100. For example, object 104 may be an object moving in a direction along a path that intersects vehicle 100 if it continues on its current trajectory. Object 104 may be in the air or object 104 may be on the ground. Object 104 may be a bird 105 or other object 107. For example, in one example, other object 107 may another vehicle, such as an unmanned aerial vehicle (UAV). In other examples, other object 107 may a projectile either natural or man-made (e.g., such as a missile). However, other non-limiting examples of object 104 are possible.

Object 104 may have movement 109, size 111, or other characteristics 113 or various combinations of movement 109, size 111, and/or other characteristics 113. In one example, movement 109 refers to movement of object 104 with respect to vehicle 100. In other examples, movement 109 is characterized as a direction of movement of object 104 with respect to vehicle 100 and/or a speed of object 104 with respect to vehicle 100. In various examples, movement 109 is characterized as a trajectory of object 104 with respect to vehicle 100.

In one example, object avoidance system 102 may be configured to identify movement 109, size 111, and/or other characteristics 113 of object 104. In one non-limiting example, object avoidance system 102 is configured to use movement 109 and size 111 of object 104 to calculate a probability of object 104 striking the vehicle 100. Object avoidance system 102 may use movement 109 and size 111 of object 104 to aid in calculating a location that object 104 may strike vehicle 100 and/or a rotor of vehicle 100. In various examples, object avoidance system 102 is configured to use movement 109, size 111, and other characteristics 113 of object 104 to identify and/or determine other characteristics of object 104 that may strike vehicle 100.

Sensor system 108 may include one or more sensors configured to capture one or more images of object 104. For example, sensor system 108 may include one or more sensors mounted to a front of vehicle 100 in a position and/or an orientation configured to capture a plurality of images of the object 104 that is proximate the vehicle 100. Sensors of sensor system 108 may be mounted facing in a direction that vehicle 100 is traveling to view object 104 in the path of vehicle 100. In one example, one or more different types of sensors of sensor system 108 are mounted to vehicle 100. In this regard, in various examples, sensor system 108 includes at least one of a video imaging camera 115, a lidar imaging sensor 117, and/or a radar imaging sensor 119, each configured to capture a plurality of images of object 104 and provide sensor information (e.g., first sensor information) to object avoidance system 102. In various examples, object avoidance system 102 receives the plurality of images comprising sensor information and processes the sensor information to detect object 104. In addition, in various examples, object avoidance system 102 calculates a trajectory of object 104 with respect to vehicle 100 from sensor information received from sensor system 108.

In one illustrative example, object avoidance system 102 is configured to receive system images information 112 (e.g., images of object 104) from sensor system 108. In this regard, without limitation, object avoidance system 102 receives system images information 112 from sensor system 108 at a sensor system signal interface 127. In various examples, system images information 112 includes a series of images of object 104 moving along a path that is proximate to vehicle 100. However, other examples are possible, such as system images information 112 including images of object 104 that is stationary while vehicle 100 is moving along a path that is proximate to object 104. Further descriptions of detecting objects with respect to the vehicle may be found in U.S. Pat. No. 9,047,675 issued Jun. 2, 2015, which is incorporated herein by reference in its entirety.

In one illustrative example, object avoidance system 102 is configured to receive rotor position information from rotor position system 110. In this regard, in one example, object avoidance system 102 is configured to receive rotor configuration information 114 for a rotor (e.g., such as rotor 223 of FIG. 2) of vehicle 100 from rotor position system 110 at a rotor position system signal interface 129. In various examples, object avoidance system 102 is configured to use rotor configuration information 114 to determine a rotor sweep zone and/or an instantaneous position of the rotor. In some non-limiting examples, rotor configuration information 114 (e.g., second sensor information) includes rotational position information of the rotor.

In one non-limiting example, object avoidance system 102 is configured to use rotor configuration information 114 to calculate a probability of object 104 striking the vehicle 100 and/or a rotor of vehicle 100. In various examples, object avoidance system 102 uses rotor configuration information 114 to aid in calculating a location that object 104 may strike the rotor of vehicle 100, and selectively controls the rotor responsive to the calculated location. In various examples, rotor position system 110 includes a rotor position encoder 121 and/or a Hall Effect sensor 123, each configured to provide rotor configuration information 114 (e.g., rotational position information) to object avoidance system 102. In one example, rotor position encoder 121 is configured as a measuring device used to convert angular position of rotor 223 to an analog or digital signal provided as rotor configuration information 114. In yet another example, rotor position encoder 121 is configured as a video imaging camera and/or lidar imaging sensor used to provide captured images of rotor 223 as rotor configuration information 114. It will be appreciated that other non-limiting types of rotor position encoder 121 measuring devices are possible in other examples.

In various examples, other information 118 is provided by vehicle systems 116. Object avoidance system 102 is configured to receive other information 118 from vehicle systems 116 via a vehicle systems signal interface 131. In one non-limiting example, other information 118 provides a current location of vehicle 100, a current speed and direction of travel of vehicle 100, and other information or combination of information appropriate for use by object avoidance system 102 to determine a location on vehicle 100 that is proximate to object 104. In some examples, vehicle systems 116 includes a navigation system such as an inertial navigation system, a satellite based navigation system, or other systems or devices on vehicle 100 to provide other information 118, such as a geolocation of vehicle 100.

In one illustrative example, object avoidance system 102 is configured to provide control signals 125 to rotor control system 106 to control one or more rotors of vehicle 100. In this regard, without limitation, object avoidance system 102 processes the system images information 112 from sensor system 108 and rotor configuration information 114 from rotor position system 110 and uses the processed system images information 112 and rotor configuration information 114 to selectively control the rotor of vehicle 100. In some non-limiting examples, object avoidance system 102, through control signals 125, causes the rotor to speed up or to slow. In response, vehicle 100 may change a flight profile to climb, descend, turn, and/or roll to avoid contact with object 104, or to reduce damage to vehicle 100 if a strike by object 104 is imminent. In other non-limiting examples, object avoidance system 102, through control signals 125, causes the rotor to change a rotational speed, a phase, and/or a pitch of a rotor blade of the rotor to avoid contact with object 104, or if contact is unavoidable, to reduce damage to the rotor.

FIG. 1B illustrates a block diagram of object avoidance system 102 of FIG. 1A in accordance with an example of the disclosure. As shown in FIG. 1B, object avoidance system 102 includes a processor 120, a memory 122, a machine readable medium 124, a display 126, and a communication interface 128 which may be implemented within vehicle 100. In some examples, one or more parts of object avoidance system 102 may be located remote from vehicle 100. In this particular example, object avoidance system 102 receives and processes the system images information 112 and the rotor configuration information 114, and provides control signals 125 to one or more rotors to control a speed and/or a phase of the rotors, and/or a pitch angle of a rotor blade of the rotor.

Processor 120 may include, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein.

In various examples, it should be appreciated that processing operations and/or instructions are integrated in software and/or hardware as part of processor 120, or code (e.g., software or configuration data) which is stored in memory 122. Examples of processing operations and/or instructions disclosed herein are stored by a machine readable medium 124 in a non-transitory manner (e.g., a memory, a hard drive, a compact disk, a digital video disk, or a flash memory) to be executed by a computer (e.g., logic or processor-based system) to perform various methods disclosed herein.

Memory 122 includes one or more memory devices (e.g., one or more memories) to store data and information. The one or more memory devices include various types of memory including volatile and non-volatile memory devices, such as RAM (Random Access Memory), ROM (Read-Only Memory), EEPROM (Electrically-Erasable Read-Only Memory), flash memory, or other types of memory. In one example, processor 120 is adapted to execute software stored in memory 122 to perform various methods, processes, and operations in a manner as described herein.

Display 126 includes, in one example, a display device (e.g., a liquid crystal display (LCD)) or various other types of generally known video displays, monitors, and/or gauges for use with vehicle 100. Processor 120 may be adapted to display system images information 112, rotor configuration information 114, and other information 118 on display 126. Processor 120 may be adapted to retrieve system images information 112, rotor configuration information 114, and other information 118 from memory 122 and display any retrieved system images and/or information on display 126. Display 126 may include display electronics, which may be utilized by processor 120 to display system images and sensor information. Display 126 may receive the system images and sensor information directly from one or more sensors of vehicle 100 via processor 120, or the system images and sensor information may be transferred from memory 122 via processor 120. Furthermore, processor 120 may be adapted to be integrated as part of display 126 to operate as both a user input device and a display device, such as, for example, a touch screen device adapted to receive input signals from a user touching different parts of the display screen.

Processor 120 is adapted to interface and communicate with sensor system 108, rotor position system 110, rotor control system 106, vehicle systems 116, and/or display 126 via a communication interface 128 to perform method and processing steps as described herein. Communication interface 128 includes wired or wireless communication buses within vehicle 100. Communication interface 128 may be implemented as a wireless communication interface and may include, for example, Wi-Fi, Bluetooth, Zigbee, and/or other radio wave or optical interfaces.

In some examples, geometric and mechanical calculations for control of rotor control system 106 are performed off-line, with results stored in lookup tables or other data structures within memory 122. Off-line calculations allow vehicle 100 to use fewer processing resources during operations and/or reduce computation time required to perform operations of object avoidance system 102. Off-line calculations may include calculations to estimate a trajectory and/or current path of object 104, estimation of a location within a rotor sweep zone that object 104 may contact, computation of acceptable changes in the rotation rate of rotors in the path of object 104, and/or computation in rotation rates of one or more unaffected rotors to maintain an attitude and/or a rate of ascent of the vehicle 100.

Figure 2:
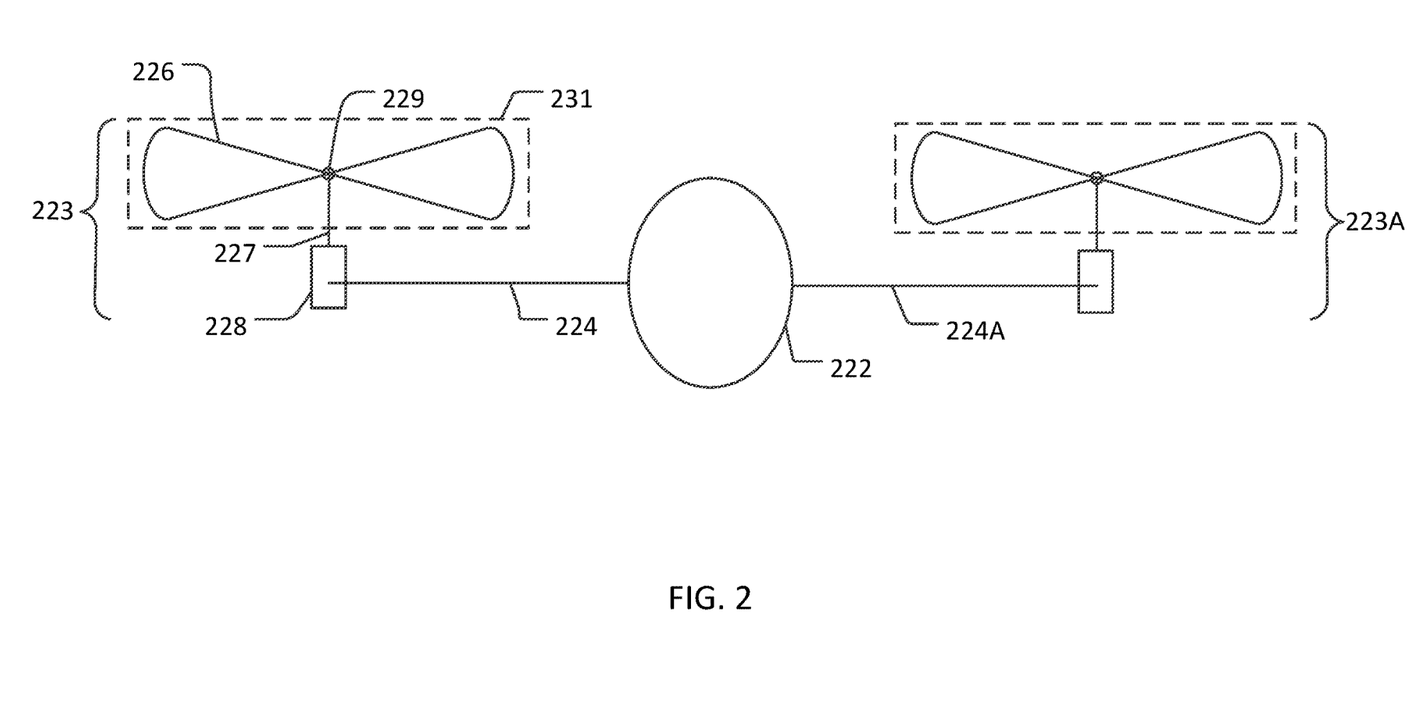
FIG. 2 illustrates a diagram of a multi-rotor vehicle in accordance with an example of the disclosure.

FIG. 2 illustrates a diagram of a multi-rotor vehicle in accordance with an example of the disclosure. As shown in the illustrative example of FIG. 2, vehicle 100 includes a fuselage 222, a rotor 223, and one or more additional rotors 223A. In some examples, vehicle 100 is configured as a multi-rotor rotorcraft including two, and typically four to eight rotors arranged symmetrically around a longitudinal vertical plane of vehicle 100.

As illustrated, fuselage 222 includes a strut 224 having a first end fixed to fuselage 222. Strut 224 extends longitudinally from fuselage 222 to rotor 223. Strut 224 includes a second end that is coupled to rotor 223. In various examples, vehicle 100 includes one or more additional struts 224A and one or more additional rotors 223A. Each of the additional struts 224A includes a first end fixed to fuselage 222 and a second end coupled to a corresponding one of the additional rotors 223A.

In various examples, each rotor 223 includes a motor 228, an axle 227, and a rotor blade 226. As illustrated in the non-limiting example of FIG. 2, rotor 223 is coupled to strut 224 at motor 228. Axle 227 is coupled between motor 228, and rotor blade 226 at hub 229. In some examples, axle 227 is configured to turn rotor blade 226 responsive to power provided by motor 228. However, other connections and mechanisms between motor 228 and rotor blade 226 are possible in other examples, to turn rotor blade 226 and/or change a pitch angle of rotor blade 226.

A rotor sweep zone 231 is defined as the circumferential path swept by rotor blade 226 over a single revolution. In some examples, processor 120 uses the rotor sweep zone 231 in a calculation to determine that object 104 may strike rotor 223 of vehicle 100. In this regard, rotor sweep zone 231 provides an accurate and timely approximation of a potential strike by object 104. In other examples, an instantaneous position of rotor blade 226 is calculated to determine that object 104 may strike rotor 223.

Figure 3:
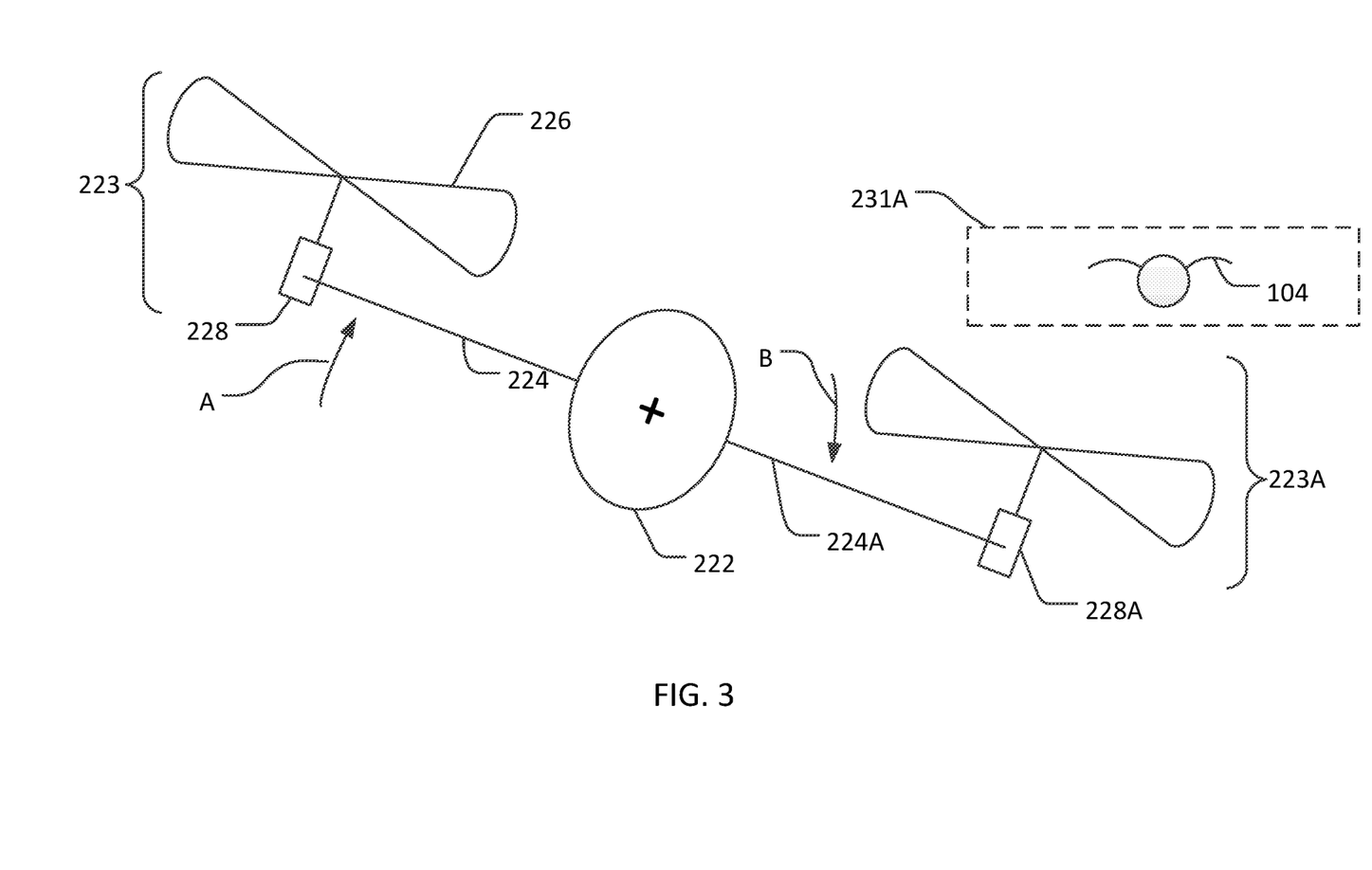
FIG. 3 illustrates a diagram of a multi-rotor vehicle in motion to avoid an object in accordance with an example of the disclosure.

FIG. 3 illustrates a diagram of a vehicle 100 in motion to avoid an object in accordance with an example of the disclosure. As illustrated, FIG. 3 shows how object avoidance system 102 controls the vehicle 100 to avoid contact with object 104. In one example, object 104 is configured as a bird. In other examples, object 104 may be configured as a projectile (e.g., such as a missile), and/or as a second vehicle.

In various examples, sensor system 108 provides system images information 112 of object 104 proximate to vehicle 100. In this particular example, processor 120 calculates a position and trajectory of object 104 with respect to rotor sweep zone 231A of one of the additional rotors 223A. Based on the calculation, processor 120 provides control signals 125 to motor 228A to selectively reduce a rotational speed of the one of the additional rotors 223A. Responsive to control signals 125, one of additional struts 224A and one of additional rotors 223A move in a downward direction, as shown by arrow B. Further, processor 120 provides control signals 125 to motor 228 to selectively increase a rotational speed of rotor 223. Responsive to control signals 125, strut 224 and rotor 223 move in an upward direction, as shown by arrow A. In this regard, vehicle 100, including fuselage 222, moves in a direction away from object 104 to avoid contact with object 104.

In some examples, motor 228 is configured to selectively adjust a rotational speed of the rotor 223 and/or a phase of the rotor 223 in response to control signals 125 provided by object avoidance system 102. In other examples, motor 228 is configured to selectively adjust a pitch angle of rotor blade 226 in response to control signals 125.

Figure 4:
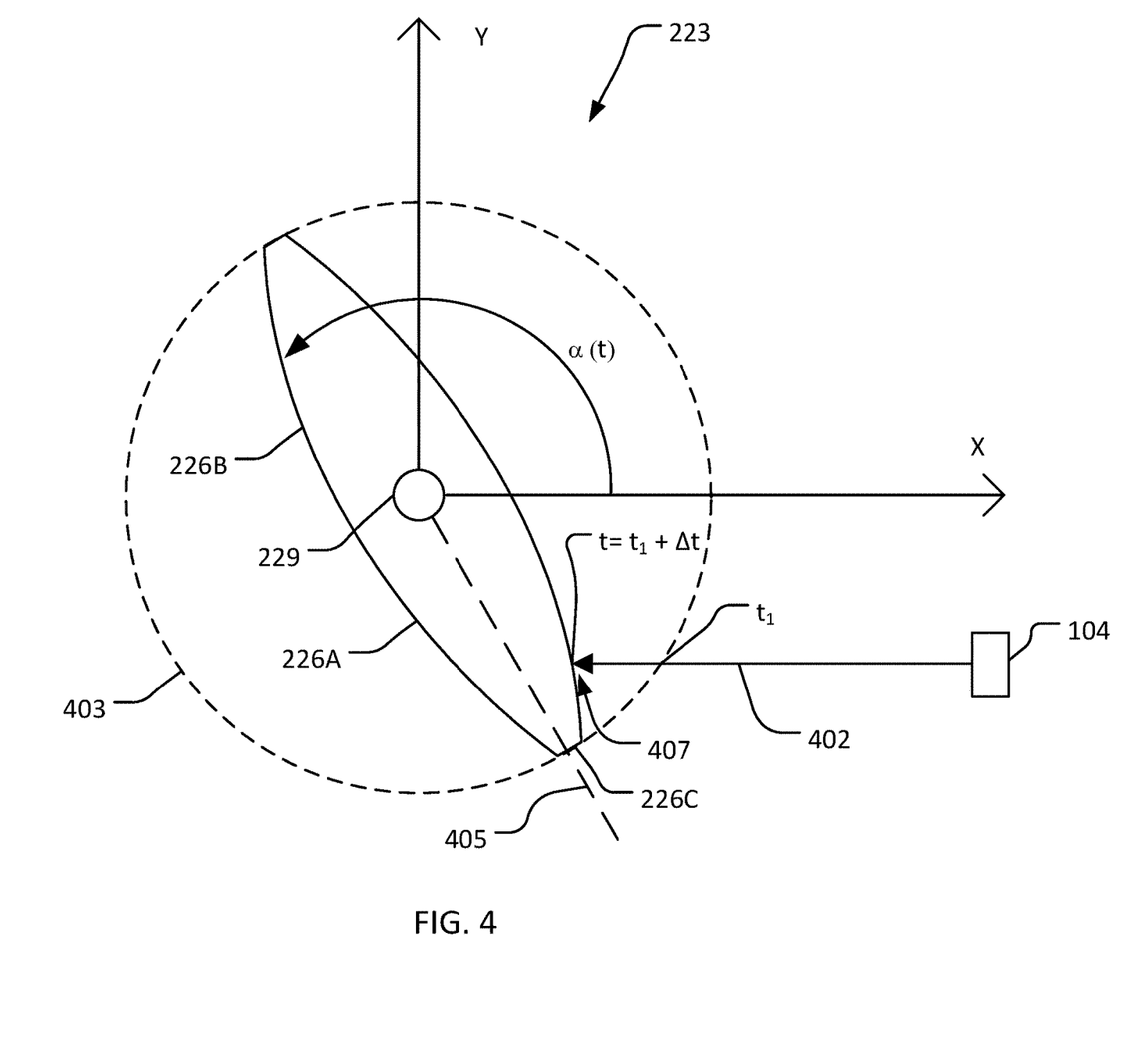
FIG. 4 illustrates a diagram of a rotational position of a rotor of the vehicle in FIG. 1 in accordance with an example of the disclosure.

FIG. 4 illustrates a diagram of a rotational position of a rotor 223 of vehicle 100 of FIG. 1 in accordance with an example of the disclosure. In the illustrated example of FIG. 4, a set of equations are used to determine if and where object 104 may strike rotor blade 226 of rotor 223. In various examples, rotor blade 226 is thicker at a location nearer to hub 229 of rotor 223, and tapers toward rotor blade tip 226C. Rotor blade tip 226C moves faster through the air than rotor blade 226 near hub 229. In this regard, a strike by object 104 at the rotor blade tip 226C would impart significantly more damage to rotor blade 226 than a strike by object 104 at the rotor blade 226 nearer to hub 229. Object avoidance system 102 may take action to increase a speed of rotor 223 or change a phase of rotor 223 to avoid contact with rotor blade tip 226C or miss rotor 223 entirely to reduce damage to vehicle 100.

FIG. 4 illustrates rotor 223 with two rotor blades, 226A and 226B. Rotor 223 initially rotates at angular velocity $\omega_o$. The position $\alpha_A(t)$ of rotor blade 226A at time t is given by equation 1.1 and the position $\alpha_B(t)$ of rotor blade 226B at time t is given by equation 1.2.

$$\alpha_A(t) = \omega_o(t - t_o) + \phi_o \qquad \text{equation 1.1}$$

$$\alpha_B(t) = \alpha_A(t) + \pi \qquad \text{equation 1.2}$$

Time $t_o$ represents the time at which path 402 of object 104 is calculated by processor 120, and $\phi_o$ is the angular phase of rotor 223 at time $t_o$.

Coordinates axis of x and y coordinates are centered on hub 229. The x coordinate extends in a direction anti-parallel to path 402 projected into a rotor disk 403 (e.g., coordinate x is close to the forward longitudinal direction of vehicle 100 at a typical speed). The y coordinate is perpendicular to the x coordinate and parallel to rotor disk 403. Path 402 of object 104 is given by equation 1.3 for y(t) and equation 1.4 for x(t). Coordinates $x_o$ and $y_o$ represent the position of object 104 at time $t_o$. Speed $v_{REL}$ represents the velocity of object 104 relative to vehicle 100.

$$y(t)=y_o \qquad \text{equation 1.3}$$

$$x(t)=x_o+v_{REL}(t-t_o) \qquad \text{equation 1.4}$$

Rotor blade 226A and rotor blade 226B is approximated as a straight line through an origin given by equation 1.5, y=ax. A slope a(t) of equation 1.5 is given by equation 1.6, a(t)=tan[a(t)], and is a function of time t. A centerline 405 shows a rotor blade 226A at time t.

Processor 120 calculates if and where object 104 may strike rotor blade 226A and/or rotor blade 226B. As shown in FIG. 4, object 104 enters rotor disk 403 along path 402 at time $t_1$. Processor 120 calculates that if rotor 223 maintains its initial speed, the centerline 405 of rotor blade tip 226C may intersect path 402 at time $t_1$ and object 104 may strike the rotor 223 at rotor blade tip 226C. In one example, processor 120 calculates a new angular velocity of rotor 223 that avoids an object 104 strike at rotor blade tip 226C.

If a strike is unavoidable, processor 120 calculates a new angular velocity $\omega_0$ (e.g., slows down rotor 223) such that object 104 strikes rotor blade 226A nearer to hub 229 at arrow 407 to reduce damage to rotor blade 226A and/or vehicle 100. Further, in one non-limiting example, processor 120 may calculate the new angular velocity $\omega_o$ to remain within structural limits of vehicle 100, remain within a short-term torque limit of motor 228, and remain within power limits of an electrical power system of vehicle 100.

Figure 5:
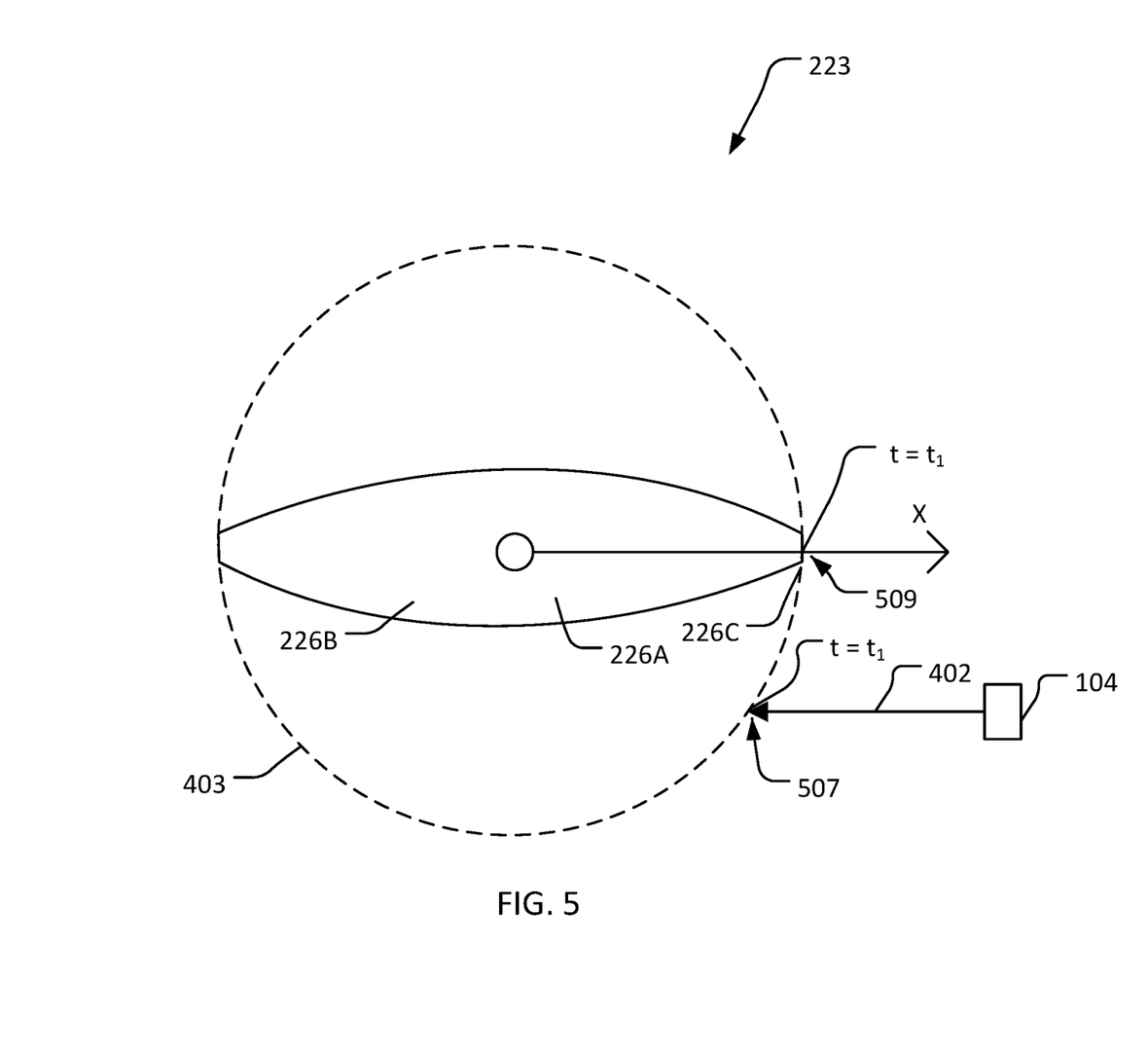
FIG. 5 illustrates a diagram of avoiding an object strike at a rotor of a vehicle in accordance with an example of the disclosure.

FIG. 5 illustrates a non-limiting example of avoiding a strike by object 104 at rotor 223. As shown in FIG. 5, processor 120 calculates and determines that as object 104 travels along path 402 and enters rotor disk 403 at a location 507 at time $t_1$, an increase in speed of rotor 223 moves rotor blade 226A (e.g., and rotor blade 226B) along rotor disk 403 to a location 509 to avoid a strike by object 104 at rotor 223. In this regard, a distance from location 507 to location 509 along rotor disk 403 represents a margin between rotor blade 226A and object 104 at time $t_1$.

Figure 6:
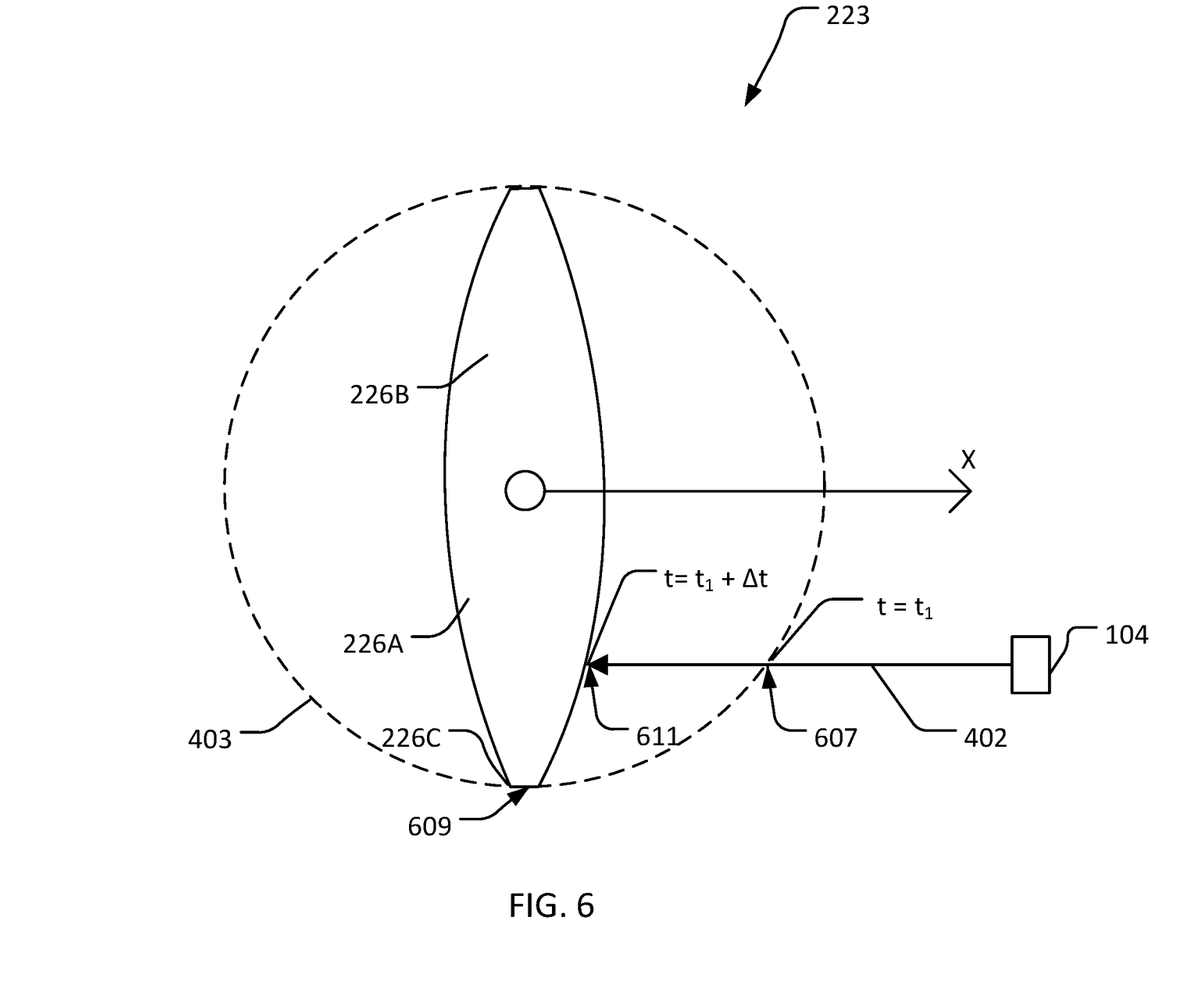
FIG. 6 illustrates a diagram of minimizing damage to a rotor of the vehicle of FIG. 1 based on an object strike in accordance with an example of the disclosure.

FIG. 6 illustrates a non-limiting example of reducing damage to a rotor 223 of the vehicle 100 of FIG. 1 based on an object 104 strike. In the non-limiting example shown in FIG. 6, processor 120 calculates that as object 104 travels along path 402 and enters rotor disk 403 at a location 607 at time $t_1$, object 104 may strike rotor blade 226A at rotor blade tip 226C. Processor 120 may provide control signals 125 to rotor 223 to decrease a speed of rotor 223 such that at a time $t=t_1+\Delta t$, rotor blade 226A is at a location 609 along rotor disk 403, and object 104 has traveled to a location 611 on rotor blade 226A and impacted rotor 223 at location 611. In this regard, object 104 strikes rotor blade 226A at a point nearer to hub 229 and not at rotor blade tip 226C to reduce damage to rotor 223 of vehicle 100.

Figure 7:
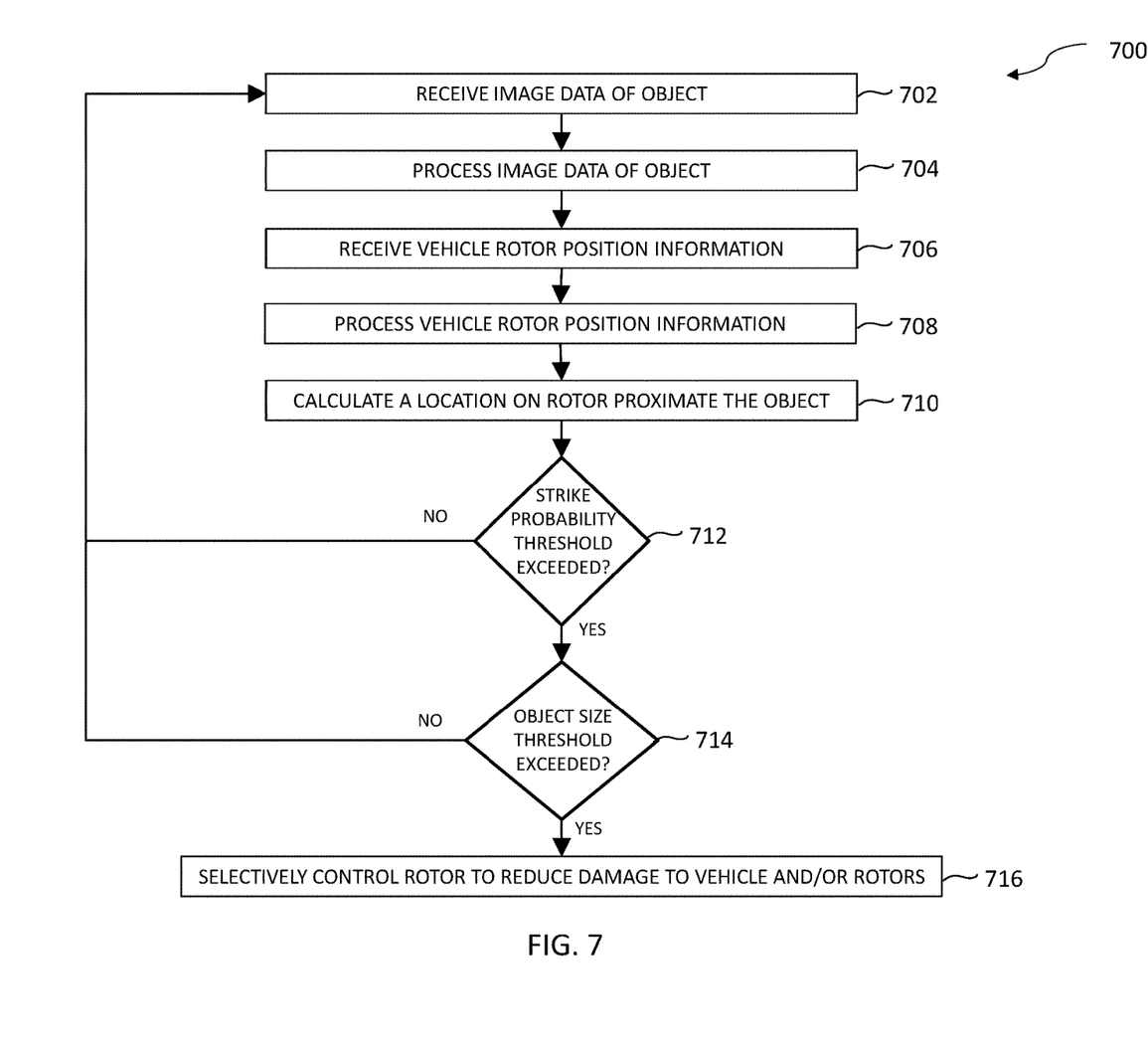
FIG. 7 illustrates a process of avoiding an object strike on a multi-rotor vehicle in accordance with an example of the disclosure.

FIG. 7 illustrates a method or process 700 of avoiding an object strike in accordance with an example of the disclosure. The process may begin at block 702 where processor 120 of object avoidance system 102 receives system images information 112 captured by sensor system 108. For example, block 702 may include receiving the first sensor information associated with object 104 proximate the vehicle 100. The receiving the first sensor information may include receiving image information from at least one of a video imaging camera (115), a lidar imaging sensor (117), or a radar imaging sensor (119).

At block 704, processor 120 of object avoidance system 102 processes the system images information 112. Block 704 may include processing the image information to detect object 104 and calculating a trajectory of object 104 responsive to object 104 being detected.

At block 706, processor 120 receives rotor configuration information 114 of vehicle 100 that is captured by rotor position system 110. Block 706 may include receiving the second sensor information associated with rotor 223. The receiving the second sensor information comprises receiving rotational position information of rotor 223.

At block 708, processor 120 of object avoidance system 102 processes the rotor configuration information 114 of vehicle 100 captured by rotor position system 110. For example, block 708 may include processing the rotational position information of rotor 223.

At block 710, processor 120 calculates a location on rotor 223 that is proximate to the object 104. Further, processor 120 determines, based on the path 402 of object 104, if and when object 104 may strike the rotor 223 and/or vehicle 100 if vehicle 100 remains on its current path.

At block 712, processor 120 is configured to calculate a probability of the object 104 striking at least the rotor 223 or vehicle 100 based on the processed system images information 112 and the processed rotor configuration information 114. If the calculated probability of object 104 striking at least the rotor 223 or vehicle 100 exceeds a strike threshold value, then the process continues to block 714. If the calculated probability does not exceed the strike threshold value, then the process moves to block 702 to receive additional image information from system images information 112.

At block 714, processor 120 is configured to calculate a size (e.g., a mass) of object 104 based on the processed images of system images information 112. If a calculated magnitude of the size of the object 104 exceeds an object size threshold value, then the process continues to block 716. If the calculated magnitude of the size of object 104 does not exceed an object size threshold value, then the process moves to block 702 to receive additional image information from system images information 112.

At block 716, in various non-limiting examples, processor 120 selectively controls rotor 223 to avoid and/or reduce damage to rotor 223 and/or vehicle 100 based on calculations of object 104 trajectory, rotor blade 226A and rotor blade 226B position, and vehicle 100 location. In this regard, processor 120 may provide control signals 125 to rotor 223 to increase a speed of rotor 223, decrease a speed of rotor 223, adjust a phase of rotor 223, and/or adjust a pitch angle of rotor blade 226 of rotor 223 to avoid a strike by object 104 or reduce damage to vehicle 100.

In view of the present disclosure, it will be appreciated that a vehicle 100 implemented in accordance with various examples set forth herein may provide for reducing damage to a rotor 223 and/or vehicle 100 based on an object 104 proximate the vehicle 100. The vehicle 100 incorporates a sensor system 108 and a rotor position system 110 to provide system images information 112 and rotor configuration information 114, respectively, to an object avoidance system 102. Object avoidance system 102 includes a processor 120 configured to process system image information and rotor configuration information in order to calculate a path of an object 104 proximate the vehicle 100 and a rotational position of rotor 223. Processor 120 is further configured to provide control signals 125 to rotor 223 to adjust a speed and/or phase of rotor 223 and/or a pitch angle of rotor blade 226 of rotor 223 in response to the calculation, to avoid a strike by object 104 and/or reduce damage to rotor 223 and/or vehicle 100 if a strike by object 104 is unavoidable to maintain maneuverability of vehicle 100, reduce downtime for repairs, and lower operational costs of vehicle 100.

Where applicable, various examples provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Examples described above illustrate but do not limit the disclosure. It should also be understood that numerous modifications and variations are possible in accordance with the principles of the present disclosure. Accordingly, the scope of the disclosure is defined only by the following claims.

What is claimed is:

1. A vehicle comprising:
   a plurality of rotors,
      wherein two rotors of the plurality of rotors are arranged as a pair of rotors symmetrically about a longitudinal vertical plane of the vehicle,
      wherein each of the rotors of the plurality of rotors comprises at least two rotor blades and a hub, and
      wherein each of the rotor blades is rotationally coupled to a corresponding hub allowing each rotor blade to change a pitch angle of the rotor blade relative to the hub;
   a first sensor configured to provide first sensor information associated with an object proximate the vehicle;
   a second sensor configured to provide rotor configuration information associated with each of the rotors of the plurality of rotors; and
   a processor coupled to the first sensor and to the second sensor, the processor being configured to:
      estimate one or more future positions of the object relative to each of one or more of the rotor blades;
      determine when the object will strike any one of the one or more of the rotor blades; and
      in response to the determining indicating that the objects will strike at least one of the one or more of the rotor blades, selectively control each of the rotors of the plurality of rotors to minimize damage to the at least one of the one or more of the rotor blades by the object based on the first sensor information and the rotor configuration information.

2. The vehicle of claim 1, wherein the processor is further configured to:
   provide control signals to each of the rotors of the plurality of rotors to selectively adjust at least one of a rotational speed of each of the rotors of the plurality of rotors, a phase of each of the rotors of the plurality of rotors, or the pitch angle of the one or more of the rotor blades to selectively control each of the rotors of the plurality of rotors.

3. The vehicle of claim 1, wherein the second sensor comprises:
   a position encoder configured to provide the rotor configuration information comprising:
      rotational position information of each of the rotors of the plurality of rotors,
      wherein the determining that the object will strike any one of the one or more of the rotor blades further comprises:
         calculating a strike location on the one or more of the rotor blades, the strike location being a location at which the object is estimated to strike the any one of the one or more of the rotor blades, and
      wherein the processor is further configured to:
         selectively control each of the rotors of the plurality of rotors responsive to calculating the strike location.

4. The vehicle of claim 3, wherein the processor is further configured to:
   determine that the strike location is at a tip of the any one of the one or more of the rotor blades; and
   selectively control each rotor to move the strike location further away from the tip of the any one of the one or more of the rotor blades.

5. The vehicle of claim 3, wherein the first sensor comprises an imaging sensor.

6. The vehicle of claim 1, wherein the processor is further configured to:
   calculate a probability of the object striking at least one of the rotors of the plurality of rotors based on the first sensor information and the rotor configuration information, and
   selectively control each of the rotors of the plurality of rotors based on whether the probability exceeds a strike threshold value in order to reduce damage to at least one of the plurality of rotors or the vehicle.

7. The vehicle of claim 1, wherein the processor is further configured to:
   calculate a magnitude of size of the object based on the first sensor information, and
   selectively control each of the plurality of rotors based on whether the magnitude of size of the object exceeds an object size threshold value.

8. The vehicle of claim 1, further comprising:
   a fuselage; and
   a first strut comprising:
      a first strut first end fixed to the fuselage, the first strut extending longitudinally from the fuselage to a first rotor of the plurality of rotors, and
      a first strut second end coupled to the first rotor,
   wherein the vehicle is a rotorcraft and the object is one of a bird, a projectile, or a second vehicle.

9. The vehicle of claim 8, wherein the vehicle further comprises:
   one or more additional struts; and
   one or more additional rotors of the plurality of rotors, wherein each of the one or more additional struts comprises:
      an additional strut first end fixed to the fuselage and extending longitudinally from the fuselage to a corresponding one of the one or more additional rotors of the plurality of rotors; and an additional strut second end coupled to the corresponding one of the one or more additional rotors of the plurality of rotors.

10. A vehicle comprising:

a plurality of rotors,
wherein two rotors of the plurality of rotors are arranged as a pair of rotors symmetrically about a longitudinal vertical plane of the vehicle,
wherein each of the rotors of the plurality of rotors comprises at least two rotor blades and a hub, and
wherein each rotor blade is rotationally coupled to the hub allowing each rotor blade to change a pitch angle of the rotor blade relative to a corresponding hub;

a first sensor configured to provide a-first sensor information associated with an object proximate the vehicle;

a second sensor configured to provide rotor configuration information associated with each of the rotors of the plurality of rotors;

a processor coupled to the first sensor and to the second sensor, the processor being configured to:
estimate one or more future positions of the object relative to each of one or more of the rotor blades;
determine when the object will strike any one of the one or more of the rotor blades;
selectively control one or more of the plurality of rotors to minimize damage to the vehicle by the object based on the first sensor information and the rotor configuration information; and
selectively control one or more additional rotors of the plurality of rotors to maintain at least one of an attitude or a rate of ascent of the vehicle.

11. A method of reducing damage to the vehicle of claim 1, the method comprising:
receiving the first sensor information associated with the object proximate the vehicle;
receiving the rotor configuration information associated with each rotor; and
selectively controlling each rotor to reduce damage to the vehicle by the object based on the first sensor information and the rotor configuration information.

12. A method of reducing damage to a vehicle having a plurality of rotors, wherein two rotors of the plurality of rotors are arranged as a pair symmetrically about a longitudinal vertical plane of the vehicle, the method comprising:
receiving, with a first sensor, first sensor information associated with an object proximate the vehicle;
receiving, with a second sensor, rotor configuration information associated with each of the rotors of the plurality of rotors,
wherein each rotor of the plurality of rotors comprises at least two rotor blades and a hub, and
wherein each rotor blade is rotationally coupled to the hub allowing each rotor blade to change a pitch angle of the rotor blade relative to a corresponding hub;
estimating one or more future positions of the object relative to each of one or more of the rotor blades;
determining that the object will strike any one of the one or more of the rotor blades; and
in response to the determining indicating that the object will strike at least one of the one or more of the rotor blades, selectively controlling each of the rotors of the plurality of rotors to reduce damage to the at least one of the one or more of the rotor blades by the object based on the first sensor information and the rotor configuration information.

13. The method of claim 12, wherein the receiving the rotor configuration information comprises:
receiving rotational position information of each of the rotors of the plurality of rotors, and
wherein the determining that the object will strike the any one of the one or more of the rotor blades comprises:
processing the rotational position information;
calculating a strike location on the one or more of the rotor blades, the strike location being a location at which the object is estimated to strike the one or more of the rotor blades; and
selectively controlling each of the rotors of the plurality of rotors responsive to calculating the strike location.

14. The method of claim 13, further comprising:
determining the strike location as being adjacent to a tip of the any one of the one or more rotor blades; and
selectively controlling each of the rotors of the plurality of rotors to move the strike location further away from the tip of the any one of the one or more rotor blades.

15. The method of claim 13, wherein the receiving the first sensor information comprises receiving information from an imaging sensor.

16. The method of claim 12, further comprising:
calculating a probability of the object striking at least one of the rotors of the plurality of rotors of the vehicle, and
selectively controlling each of the rotors of the plurality of rotors based on whether the probability exceeds a strike threshold value in order to reduce damage to at least one of the plurality of rotors or the vehicle.

17. The method of claim 12, further comprising:
calculating a magnitude of size of the object, and
selectively controlling each of the plurality of rotors based on whether the magnitude of size of the object exceeds an object size threshold value.

18. The method of claim 12, further comprising:
a fuselage; and
a first strut comprising:
a first strut first end fixed to the fuselage, the first strut extending longitudinally from the fuselage to a first rotor of the plurality of rotors, and
a first strut second end coupled to the first rotor,
wherein the vehicle is a rotorcraft and the object is one of a bird, a projectile, or a second vehicle.

19. The method of claim 18, wherein the vehicle further comprises:
one or more additional struts and one or more additional rotors of the plurality of rotors, wherein each of the one or more additional struts comprises:
an additional strut first end fixed to the fuselage, extending longitudinally from the fuselage to a corresponding one of the one or more additional rotors of the plurality of rotors, and
an additional strut second end coupled to the corresponding one of the one or more additional rotors of the plurality of rotors.

20. The method of claim 19, further comprising:
selectively controlling the one or more additional rotors to maintain at least one of an attitude of the vehicle or a rate of ascent of the vehicle.

* * * * *

UNITED STATES PATENT AND TRADEMARK OFFICE
CERTIFICATE OF CORRECTION

PATENT NO. : 11,281,235 B2
APPLICATION NO. : 16/121460
DATED : March 22, 2022
INVENTOR(S) : Brian J. Tillotson Page 1 of 1

It is certified that error appears in the above-identified patent and that said Letters Patent is hereby corrected as shown below:

In the Claims

In Claim 1, Column 11, Line 60, change "objects" to --object--

In Claim 10, Column 13, Line 16, change "a-first" to --a first--

Signed and Sealed this
Twenty-first Day of June, 2022

Katherine Kelly Vidal
*Director of the United States Patent and Trademark Office*